3,097,124
INSULATING WALL BOARD AND METHOD OF FORMING SAME
Maurice Denenberg, 2028 Washington Ave., P.O. Box 7362, Wynnewood 46, Pa.
Filed Aug. 30, 1957, Ser. No. 681,399
2 Claims. (Cl. 154—44)

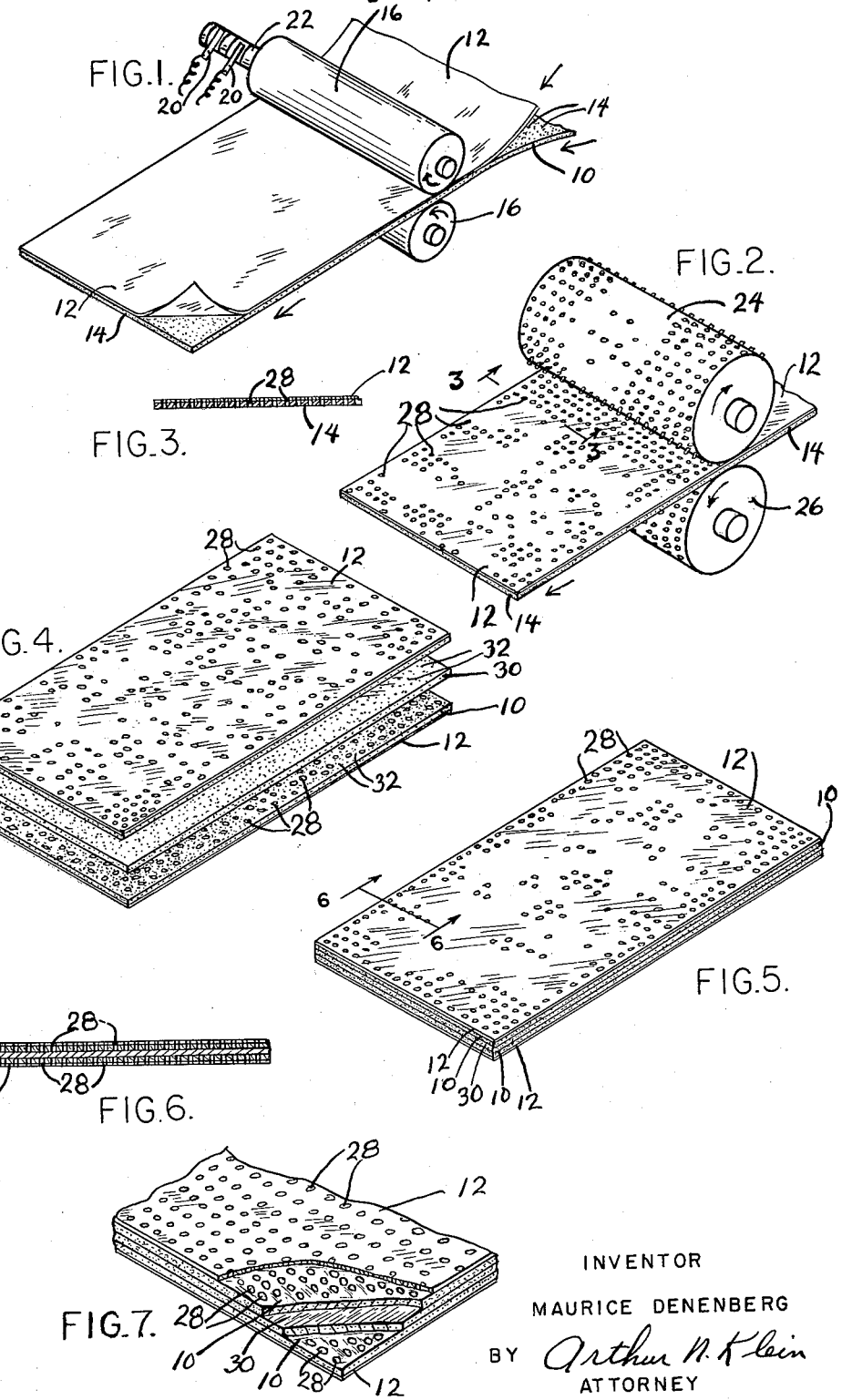

The present invention relates generally to heat-insulating wall-board or the like and methods of forming the same; and it relates more particularly to heat-insulating wall-board or the like of laminated multi-ply fibre board or paper board faced with heat-reflecting metal foil and to methods of forming the same.

An object of the present invention is to provide a new and useful construction for a heat-insulating wall-board or the like; as well as a novel method of forming the same. Another object of this invention is to provide a new and improved construction for a laminated multi-ply heat-insulating wall-board having bonded plies of wet strength fibre board or paper board (the grain of adjoining plies being preferably at more or less right angles to each other to increase the strength and rigidity of the final product) and having outer heat-reflecting faces of metal foil, for example aluminum foil, bonded to the outermost fibre-board plies, which is extremely efficient as a heat insulator while at the same time permitting adequate passage of water vapor therethrough so as to prevent the harmful building up of moisture in enclosed insulating air spaces; as well as a novel method of forming the same.

Other objects and advantages of the present invention are apparent in the following detailed description, appended claims and accompanying drawings forming part of this application.

It has heretofore been suggested that paper board faced with aluminum foil can serve as an efficient heat insulator in building construction and the like. However, in contrast to the somewhat more porous paper board, aluminum foil provides a continuous imperforate surface which, for practical purposes, is impervious to water vapor. As a result, there is no way for the water vapor to escape from the enclosed air space (for example the space between the insulating wall-board, which is customarily nailed to the inner edges of the joists, and the outside wall of the building) created.

Also, ordinary aluminum foil faced wall board completely eliminates air passage or "breathing" through the insulating board. While a reduction in convection is desirable in insulating material, complete elimination of air and water vapor passage is undesirable, in that it creates wholly stagnant sealed off compartments of air which not only creates a fire hazard but also produces rotting and decay of wood and other structural surfaces due to the fact that the water vapor trapped in the sealed compartment condenses on the wood and other surfaces (particularly when there is a drop in temperature) and appreciably accelerates the ordinary rate of rotting and decay of the structural material (including joists, outside wood panels and shingles, etc.).

According to the present invention, there has been developed a new and improved heat-insulating wall-board (as well as a method of forming the same) which incorporates all of the advantages of laminated multi-ply wet strength fibre board or paper board with outer heat-reflecting faces of metal foil (such as aluminum foil) (including extremely effective insulating properties without bulk, adequate structural strength, low cost, ease of cutting to size and installing) while eliminating the shortcomings of the prior art and permitting circulation of air and passage of water vapor therethrough, without impairing such desirable functions as reducing heat-transmitting convection and being substantially impervious to surface water or the like.

In general, I form my novel heat-insulating wall-board by first adhering a sheet of aluminum foil or the like to one face of a single-ply panel of fibre board having substantial wet strength, using a suitable adhesive, heat and pressure. I then perforate both the aluminum foil and the fibre board ply (for example using a pair of opposed embossing rollers) forming a large number of extremely small holes (extending through both the aluminum foil and the fibre board) over substantially the entire area of the structure. Two sheets of the aluminum faced perforated fibre board are then positioned on opposite sides of a similarly proportioned unperforated sheet of wet strength fibre board (preferably having its grain running more or less at right angles to the grain of the aluminum faced fibre board sheets, for example with the grain of the central unperforated fibre board running longitudinally and the grain of each of the two aluminum faced perforated sheets running transversely). Instead of having the central unperforated sheet of single ply construction, the central sheet can itself be of laminated construction (for example of three bonded plies with the grain of the center ply running transversely and the grain of each of the two outer plies running longitudinally). The perforated sheets are so placed that the aluminum foil covered faces are outermost and the uncovered fibre board faces are adjacent the unperforated center sheet. The two aluminum faced perforated sheets and the center unperforated sheet are then bonded together using a suitable adhesive and pressure (preferably about double the pressure employed in bonding the aluminum foil to the fibre board in the first step) but without heat. Finally, the edges of the composite multi-ply laminated sheet of insulating wall-board are trimmed, squared and treated with a water-proofing agent (for example micro-crystalline wax or a vinyl lacquer), whereupon the wall-board is ready for use and can be quickly and easily nailed to joists or the like (with or without trimming to size) quickly and easily to provide extremely efficient and non-bulky heat insulation. The holes in the aluminum foil and the outer fibre board plies, while extremely small (and too small to permit undue convection therethrough or passage of surface water) are nevertheless large enough to permit reasonably efficient passage of water vapor through the wall-board (thereby preventing undue moisture condensation inside the enclosed air space) and to permit sufficient, though small, air circulation (thereby preventing the development of a wholly stagnant air pocket such as might create a fire hazard).

The perforations or holes in the aluminum foil and the outer fibre board plies should have a diameter of about 0.01" to 0.001" and more preferably about 0.004" to 0.006". Where an opposed set of embossing rollers is used to make the holes dimples or concavities of somewhat larger diameter are simultaneously formed. However the actual holes or perforations themselves fall generally in the specified range.

As presently preferred, about eight holes are formed to the linear inch, making a total of about sixty four holes to each square inch of surface area. The number of holes can however be varied between about six holes to the linear inch (about thirty-six to the square inch) and ten holes to the linear inch (about one hundred to the square inch).

The natural porosity of the center unperforated ply (or plies) is sufficient to permit adequate passage of water vapor (and a slight amount of air circulation) through the wall-board while at the same time providing a check against excessive air circulation and transmission of surface water.

The aluminum foil employed may have a thickness of the order of 0.00035″ while the individual plies of wet strength fibre board used may be about 0.020″ thick.

While various adhesives can be used during the bonding operations, I have obtained unusually good results with a neoprene casein latex adhesive of conventional composition. The bonding of the foil to the fibre board may be carried out at a temperature of about 400° F. and a pressure of about 20,000 pounds per square inch. In the subsequent bonding operation which laminates the two aluminum faced plies to the center unperforated sheet, a much greater pressure (for example 40,000 pounds per square inch) is used because of the greater thickness of the composite multi-ply product to be bonded, as well as the absence of an elevated temperature.

For the purpose of illustrating the invention, forms thereof which are presently preferred are shown and described herein; it being understood however that the invention is not limited to the precise arrangements and instrumentalities disclosed.

Referring to the accompanying drawings in which like reference numerals indicate like parts throughout:

FIGURE 1 is a more or less schematic perspective view illustrating the first step in the method of the present invention, namely the bonding of a heat-reflecting metal foil to one face of a wet strength single ply sheet of fibre board or paper board employing adhesive, heat and pressure.

FIGURE 2 is a more or less schematic perspective view illustrating the second step in the method, namely the perforation (by means of an opposed pair of power-driven embossing rolls) of the metal foil faced fibre board product coming from the heated pressure rollers of FIG. 1, so as to form a large number of small holes or openings over substantially the entire area; the size of the holes being exaggerated for clarity of illustration.

FIGURE 3 is a cross-sectional view generally along the line 3—3 of FIG. 2, indicating how the holes or openings extend through both the metal foil facing and the fibre board ply.

FIGURE 4 is a more or less schematic perspective view illustrating the relative positioning of two foil faced apertured sheets and an unfaced unapertured central fibre board sheet preliminary to the final bonding operation.

FIGURE 5 is a perspective view of the final laminated foil faced composite heat-insulating wall-board of this invention.

FIGURE 6 is a cross-sectional view taken generally along the line 6—6 of FIG. 5.

FIGURE 7 is an enlarged fragmentary perspective view of a corner of the wall-board of FIG. 5; parts being broken away better to show the construction thereof.

In forming the novel heat-insulating wall-board of this invention, as shown in FIGS. 5, 6 and 7, I first take a sheet of fibre board or paper board 10, having substantial wet strength, about 0.020″ in thickness, and a similar size sheet of heat-reflecting metal foil (such as aluminum foil) 12 about 0.00035″ in thickness and apply a coating 14 of suitable adhesive (preferably neoprene casein latex adhesive) to one or both of the adjoining faces of the superimposed sheets 10 and 12. The two sheets are then bonded together, in the manner illustrated in FIG. 1, by passing them through an opposed pair of power driven pressure rollers 16 and 18 which subject the juxtaposed sheets to a pressure of the order of 20,000 pounds per square inch, at an elevated temperature of about 400° Fahrenheit. In FIG. 1, pressure roller 16 is shown as being provided with a pair of brush-type electrical contacts 20 on the shaft 22 to carry electrical current to heating coils (not shown) disposed within the roller 16 to achieve the necessary elevated temperature. While only the one roller 16 is illustrated as being provided with heating means, it is, of course, possible to provide such heating means for the other roller 18 as well, if this is necessary to attain the desired temperature, which depends, inter alia, on the speed at which the sheets 10 and 12 pass between the rollers.

It is also possible to provide other conventional heating means to achieve the desired elevated temperature, which facilitates and improves bonding by causing hardening or curing or setting of the adhesive. Thus, for example, the pressure rollers could simply be placed inside a conventional enclosed heater or oven (not shown), electric-powered or gas-fired, to raise the temperature of the sheets and the adhesive to the desired point during the bonding operation.

I prefer to employ aluminum foil of a quality known in the art as dry annealed dead soft for optimum results. The wet strength fibre board employed is of a quality known in the art as hard sized.

The aluminum faced fibre board leaving the bonding rollers 16 and 18 is then perforated by passing it through a pair of opposed power driven embossing rollers 24 and 26; the roller 24 being provided with a plurality of small pointed projections while the roller 26 has a plurality of matching depressions so that, as indicated in FIG. 3, both the aluminum facing 12 and the fibre board 10 are penetrated to provide tiny holes 28 extending therethrough. In the drawings, the size of the holes (and of the roller projections and depressions) is exaggerated for clarity of illustration. Actually, as indicated hereinabove, the holes are of the order of about 0.01″ to 0.001″ (with a more preferred range of about 0.004″ to 0.006″) in diameter. They are spaced about six to ten per linear inch giving a total of 36 to 100 holes per square inch of surface. Preferred at present is a spacing of eight holes to the linear inch with a total of 64 holes to the square inch.

Two sheets of the aluminum faced perforated fibre board sheets are then positioned so that the non-faced sides of the fibre board are opposite each other and an unperforated non-faced sheet of fibre board 30 is placed therebetween as indicated in FIG. 4. Adhesive (preferably neoprene casein latex adhesive) is applied as at 32 to the opposed surfaces of the sheet 30 and the sheets 10. Pressure (preferably of the order of 40,000 pounds per square inch) is then applied (without heat) to bond the sheets together into the composite laminated construction shown in FIGS. 5, 6 and 7. Preferably, the central ply or sheet 30 has its grain running generally at right angles to the grain of the two plies 10 for greater structural strength.

Instead of using a single-ply sheet 30 for the central ply of the composite laminated product, it is possible to employ a laminated multi-ply unperforated non-faced fibre board sheet for this purpose, such laminated fibre board sheets being well known in the art and requiring no illustration or explanation herein.

As best illustrated in FIGS. 6 and 7, the holes 28 extend inwardly through the foil 12 and the fibre board plies 10 up to the central fibre board sheet or ply 30 which is unperforated.

The holes 28 permit water vapor to pass through the composite wall board (the central unperforated fibre board ply 30 having sufficient natural porosity to permit adequate passage of water vapor and air therethrough without significantly lessening the heat-insulating properties of the wall board) and also permit limited air passage. Thus, the sheets form a structure which is an extremely efficient heat insulator while at the same time provides a structure capable of breathing. The small size of the holes 28 and the absence of holes in the central ply 30 render the composite wall board substantially impervious to the passage of surface water through the board.

The bonding operation can be performed by means of a reciprocating press (not shown) of conventional construction which forces together pre-cut sheets of the type illustrated in FIG. 4. Instead, the bonding operation can be carried out as a continuous operation, using pressure rollers (unheated) like those shown in FIG. 1, to which the central unperforated fibre board sheet and the two outer perforated aluminum-faced fibre board sheets (coated with adhesive 32) are continuously fed in relatively elongated lengths, in a manner which is also well known in the art and requires no elaboration herein.

After the final bonding operation has been completed, the laminated wall board (which is now faced on both sides with aluminum foil suitably apertured) is cut to size, its edges being trimmed, squared and rendered waterproof, for example by being coated with micro-crystalline wax or vinyl lacquer or other suitable waterproofing composition.

The present invention may be embodied in other specific forms and therefore the embodiments described above are to be considered in all respects merely as illustrative and not restrictive; reference being made to the appended claims as indicating the scope of this invention.

Having thus described my invention, I claim as new and desire to protect by Letters Patent the following:

1. A heat-insulating laminated wall board comprising a central imperforate sheet of wet strength fiberboard, a pair of outer sheets of wet strength fiberboard bonded to opposite sides of the central sheet, a thin external facing sheet of heat-reflecting metal foil bonded to the outer side of each of said outer fiberboard sheets, each metal foil facing sheet and its underlying fiberboard sheet having a large number of small holes extending therethrough and terminating at the central imperforate fiberboard sheet, said holes having a diameter of .01 to .001 inch so that water must be in the form of a vapor to pass therethrough, whereby the sheets form a structure which is an efficient heat insulator capable of breathing.

2. A method of forming a heat-insulating laminated wall board capable of breathing comprising the steps of bonding a first thin facing sheet of heat-reflecting metal foil to one side only of a first sheet of wet strength fiberboard using adhesive with a first pressure and at an elevated temperature, then bonding a second thin facing sheet of heat-reflecting metal foil to one side only of a second sheet of wet strength fiberboard using adhesive with said first pressure and at said elevated temperature, then forming a plurality of small holes having a diameter of .01 to .001 inch through said foil-faced fiberboard sheets so that water must be in the form of a vapor to pass through said holes, then positioning said foil-faced apertured fiberboard sheets on opposite sides of a central imperforate sheet of wet strength fiberboard, and then bonding said foil-faced apertured fiberboard sheets to said central sheet with an adhesive at a second pressure substantially greater than said first pressure and at room temperature which is substantially lower than said elevated temperature.

References Cited in the file of this patent

UNITED STATES PATENTS

| | | |
|---|---|---|
| 935,903 | Frantz | Oct. 5, 1909 |
| 1,914,345 | Roos | June 13, 1933 |
| 2,172,048 | Johnson | Sept. 5, 1939 |
| 2,511,816 | Shaw | June 13, 1950 |
| 2,726,977 | See et al. | Dec. 13, 1955 |
| 2,749,267 | Gill et al. | June 5, 1956 |
| 2,754,240 | Kinney | July 10, 1956 |